Dec. 11, 1962  M. HOFFMANN  3,068,369
SHOCK-CURRENT GENERATOR

Filed Oct. 29, 1958  2 Sheets-Sheet 1

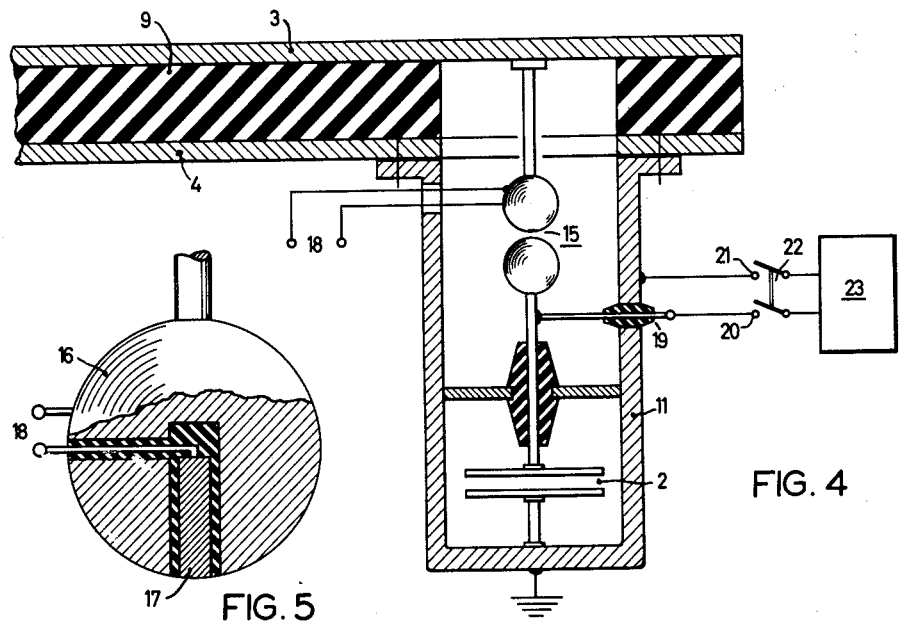
FIG. 4
FIG. 5
FIG. 6
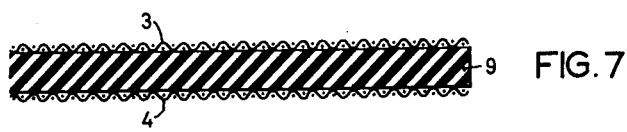
FIG. 7
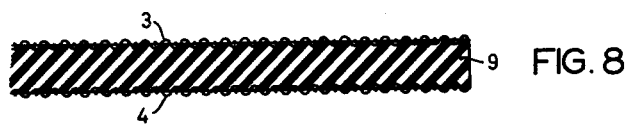
FIG. 8
FIG. 9

United States Patent Office 3,068,369
Patented Dec. 11, 1962

3,068,369
SHOCK-CURRENT GENERATOR
Manfred Hoffmann, Erlangen, Germany, assignor to Siemens-Schuckertwerke Aktiengesellschaft, Erlangen, Germany, a corporation of Germany
Filed Oct. 29, 1958, Ser. No. 770,492
Claims priority, application Germany Nov. 8, 1957
11 Claims. (Cl. 307—110)

My invention relates to a device for producing electric current surges of extreme intensity and extreme rate of increase. Such shock-current generators are useful for testing purposes and in connection with nuclear fusion processes. As known, nuclear fusion can be released in a completely ionized plasma at extremely high temperatures. The electric currents required for producing such temperatures and for magnetically concentrating the plasma are in the order of magnitude of $10^6$ amperes at a rate of increase of approximately $10^{11}$ amperes per second.

It is known to supply currents of this order of magnitude from capacitor batteries of great total capacitance. For this purpose, a multiplicity of capacitors are arranged circularly about the discharge gap for producing the nuclear fusion. The capacitors are connected parallel to each other and parallel to the correlated electrodes of the discharge gap. Such parallel connection satisfies one of the salient requirements in equipment of this type, mainly the necessity of keeping the total inductivity of the capacitors as small as possible in order to obtain the desired high rate of current increase.

However, since the electric leads from the capacitor terminals to the electrodes of the discharge gap are generally designed as coaxial conductors, the joining of these conductors with the individual electrodes of the discharge gap involves considerable constructional difficulties. Not only is the design of the junctions relatively complicated, but the leads, even if designed as coaxial conductors, also increase the inductivity of the entire plant to a considerable extent.

It is an object of my invention to devise inductivity-poor means for supplying current from the capacitors to the discharge gap, and to give the connecting means at the electrodes of the discharge gap the simplest possible construction.

To this end, and in accordance with a feature of my invention, I provide between the multiplicity of capacitors on the one hand and the correlated two electrodes of the discharge gap on the other hand, two area-type collector electrodes whose midportions are electrically connected with the respective discharge electrodes, each collector electrode having its peripheral portion electrically connected with all capacitor terminals having the same polarity.

The foregoing and other features of my invention will be more fully understood from the following description of the embodiments schematically illustrated by way of example on the accompanied drawings, in which:

FIG. 4 is a partial and sectional view of still another embodiment in conujnction with the charging and discharging means for the capacitors.

FIG. 5 illustrates, partly in section, a detail of FIG. 4; and FIGS. 6 to 9 are schematic cross-sectional views of four respective modifications relating to the collector electrodes.

The same reference characters are used in all illustrations for respective functionally similar components.

Figure 1:
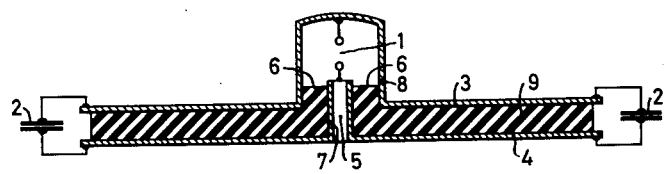
FIG. 1 is a cross-sectional view of a shock-current generator.
Figure 2:
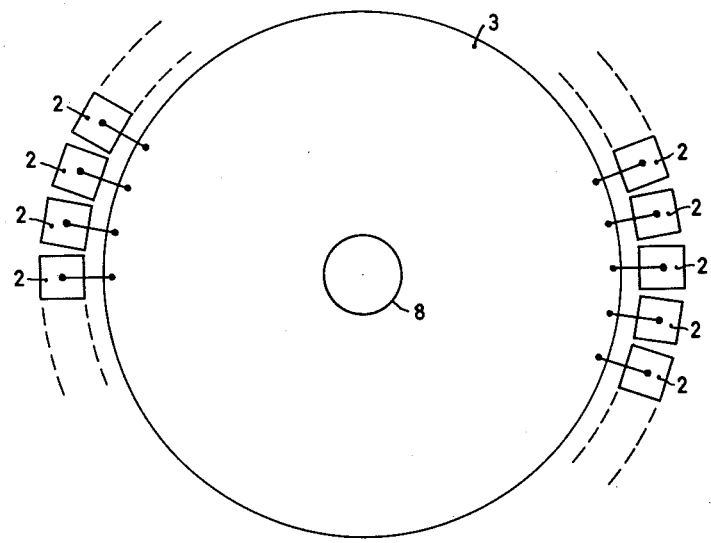
FIG. 2 is a schematic top view of the same generator.

The shock-current generator, according to FIGS. 1 and 2, comprises a discharge gap 1 which is energized from a multiplicity of capacitors 2 arranged concentrically about the discharge gap. The device is provided with two collector electrodes 3 and 4 formed of circular discs and serving as forward and return leads for passing current from the capacitors through the discharge gap. The upper and lower electrodes 3, 4 have respective circular openings 5 and 6 of respectively different diameters. The circular edges of these openings are each provided with a cylindrical tubular bushing 7 or 8 which extends in concentric relation to the axis of the collector electrodes and is electrically connected with one of the respective discharge electrodes. A body 9 of dielectric material is embedded between the two collector electrodes 3 and 4.

Figure 3:
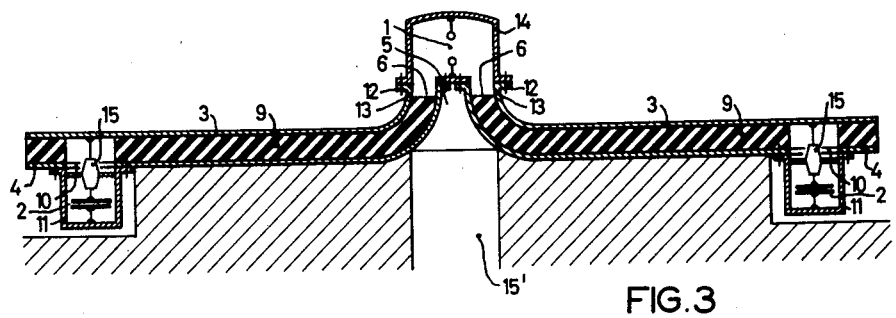
FIG. 3 is a cross-sectional and schematic view of another shock-current generator, representing a preferred embodiment of the invention.

The embodiment shown in FIG. 3 differs from that described above in that the capacitors 2 are not mounted outside the periphery of the connector electrodes 3, 4 but are located on a circle between the collector periphery and the center axis. In accordance therewith, the lower electrode 4 has a number of openings 10 corresponding to the number of capacitors and distributed on a circle with uniform spacing from each other. The openings 10 are covered by the respective capacitor housings 11. The bottom of each housing is electrically connected with one electrode of the enclosed capacitor. The capacitor housings 11 are in mechanical and electrical connection with the lower electrode 4. The other electrode of each capacitor is connected by a conductor, which may comprise an arc gap 15, with the upper electrode 3. In cases where the number of capacitors is very large, excessively large electrode dimensions can be avoided by distributing the capacitors on several concentric circles and mounting and connecting each capacitor in the same manner as described above.

A further distinction from the embodiment of FIGS. 1, 2 the generator according to FIG. 3 has the center portions of the respective collector electrodes 3 and 4 shaped to an upwardly protruding funnel structure whose upper, circular edge has a flange 13 or 13'. The flange 13' is joined by screw bolts 12 with a mating flange of a cylindrical housing 14 which encloses the discharge gap 1 and carries one of the gap electrodes. The flange 13 is joined by screw bolts with a removable cover plate that normally seals the discharge chamber and carries the other discharge electrode. A central channel 15' located beneath the discharge gap serves certain experimental purposes. However, the lower electrode 4 may also be designed as a full circular disc, without the opening in the central portion, particularly if the connecting channel 15' is not needed.

In order to resist mechanical stresses due to the shock current discharge in gap 1, the wall thickness of the collector electrodes 3 and 4 should be so dimensioned in each particular case that the electrode structures have sufficient mass inertia to prevent the discharge current from causing distortion. Generally, a wall thickness of 3 to 5 mm. is satisfactory. However, the thickness of the collector electrodes may gradually increase from the periphery toward the center, or the electrodes may be reinforced additionally in the central portion.

FIG. 4 shows a detail of FIG. 3. The arc gap 15 serves for discharging the capacitor into the collector electrodes 3, 4 at the proper moment. For this purpose, the upper electrode of gap 15 comprises a spherical body 16 which surrounds an insulated interior electrode 17. The interior electrode 17 and the spherical electrode 16 can be connected at terminal 18 to a source of voltage which supplies a voltage surge sufficient to cause sparking between the two spherical electrodes of gap 15. The occurring arc ionizes the gap and thus causes the capacitor 2 to discharge into the collector electrodes. The ignition of a capacitor gap by such trigger action is known as such and is to be provided for each of the capacitors 2 so that the trigger action by supply of a voltage surge is released simultaneously at all capacitors, thus synchronizing all capacitor discharges.

FIG. 4 also illustrates the means for charging the capacitors. The upper electrode of each capacitor 2 is connected by a conductor to a switch contact 20 through a seal 19. Another switch contact 21 is connected to the housing 11 and thus with the lower electrode of the capacitor 2. A switch 22 connects both contacts 20 and 21 with a source 23 of direct current voltage which, when switch 22 is closed charges the capacitor 2. The respective contacts 20 and 21 of all capacitors are to be connected with one another so that a single charging device 23 serves all capacitors.

As further shown in FIG. 4, the lower collector electrode 4 may be grounded through housing 11.

The area-type design of the collector electrodes in the shape of circular discs, according to FIGS. 1, 2, 3 can be modified in various ways. For example, the electrodes may be sub-divided into a number of segments which are connected with one another through the likewise subdivided dielectric material. The electrodes may further be designed as perforated metal sheets according to FIG. 6, or as wire mesh according to FIG. 7. Such a wire mesh may also be joined with the dielectric body 9 by casting the body 9 into, or together with, the wire-mesh electrodes as is schematically indicated in FIG. 8. The electrodes may be deposited on both sides of the dielectric in form of conducting coatings as is schematically shown in FIG. 9. This can be done by either cementing metal foils onto the surfaces of the dielectric body or producing a metal coating by spraying. Instead of a dry dielectric, a dielectric material entirely or partially in liquid form, such as chlophene-impregnated paper may be used.

Shock-current generators according to the invention, as described above, may have large dimensions depending upon the number of the capacitors. For example, when using 100 parallel connected capacitors, the diameter of the circular collector electrodes 3 and 4 may amount to approximately 3 to 5 meters, the diameter of the circular openings 5 and 6 in the center portion may be about 50 cm. The layer thickness of the dielectric 9 should be as small as possible. With reference to the numerical examples just given, a thickness of about 3 to 5 mm. is preferable. The voltage of the generator may be between 20 and 60 kv.

The total inductivity of a shock-current generator according to the invention has been found to be smaller than that of a plant of the same size with coaxial cables connecting the capacitors to the discharge gap, and the forces caused by the shock current have been found to be reliably withstood.

It will be obvious to those skilled in the art, upon a study of this disclosure, that my invention permits of various modifications and may be embodied in devices other than those particularly illustrated and described herein, without departing from the essence of the invention and within the scope of the claims annexed hereto.

I claim:

1. Shock-current generator, comprising a discharge gap having two gap electrodes, a multiplicity of capacitors disposed concentrically about said discharge gap, two area-type collector electrodes each having a central portion connected to a respective one of said gap electrodes and forming an electric connection between a respective one of said gap electrodes and all capacitor electrodes of one polarity, said collector electrodes being formed as circular metal discs, and a dielectric body embedded between said electrodes, said metal discs being subdivided into a predetermined number of segments, a dielectric body subdivided into segments of the same number and shape as the segments of said metal discs, the segments of said dielectric body joining together said segments of said metal discs so as to form a structural unit therewith.

2. Shock-current generator, comprising a discharge gap having two gap electrodes, a multiplicity of capacitors disposed concentrically about said discharge gap, two plane-shaped area-type collector electrodes horizontally disposed and each having a central portion connected to a respective one of said gap electrodes and forming an electric connection between a respective one of said gap electrodes and all capacitor electrodes of one polarity, at least the lower one of said collector electrodes being provided with a predetermined number of openings corresponding to the number of said multiplicity of capacitors, said openings being distributed in a circular arrangement around the peripheral marginal zone of said collector electrode.

3. Shock-current generator, comprising a discharge gap having two gap electrodes, a multiplicity of capacitors disposed concentrically about said discharge gap, two area-type collector electrodes horizontally disposed and each having a central portion connected to a respective one of said gap electrodes and forming an electric connection between a respective one of said gap electrodes and all capacitor electrodes of one polarity, at least the lower one of said collector electrodes being provided with a predetermined number of openings corresponding to the number of said multiplicity of capacitors, said openings being distributed in a circular arrangement around the peripheral marginal zone of said collector electrode in a plurality of rows.

4. Shock-current generator, comprising a discharge gap having two gap electrodes, a mulitplicity of capacitors disposed concentrically about said discharge gap, two plane-shaped area-type collector electrodes horizontally disposed and each having a central portion connected to a respective one of said gap electrodes and forming an electric connection between a respective one of said gap electrodes and all capacitor electrodes of one polarity, at least the lower one of said collector electrodes being provided with a predetermined number of openings corresponding to the number of said multiplicity of capacitors, said openings being distributed in a circular arrangement around the peripheral marginal zone of said collector electrode, said capacitors being located beneath respective ones of said openings in said lower collector electrode, and the upper one of said collector electrodes being connected to one capacitor electrode of respective capacitors through respective ones of said openings in said lower collector electrode.

5. Shock-current generator, comprising a discharge gap having two gap electrodes, a multiplicity of capacitors disposed concentrically about said discharge gap, two area-type collector electrodes horizontally disposed and each having a central portion connected to a respective one of said gap electrodes and forming an electric connection between a respective one of said gap electrodes and all capacitor electrodes of one polarity, at least the lower one of said collector electrodes being provided with a predetermined number of openings corresponding to the number of said multiplicity of capacitors, said openings being distributed in a circular arrangement around the peripheral marginal zone of said collector electrode, said capacitors being located beneath respective openings of said lower collector electrode, and the upper one of said collector electrodes being connected to capacitor electrodes of one certain polarity of respective capacitors through respective ones of said openings in said lower collector electrode, a housing surrounding said capacitors and forming a cover for the openings in said lower collector electrode, said housing forming at least part of an electrical connection between the lower one of said collector electrodes and capacitor electrodes of opposite polarity from the aforementioned ones of certain polarity.

6. Shock-current generator, comprising a discharge gap having two gap electrodes, a multiplicity of capacitors disposed concentrically about said discharge gap, two area-type collector electrodes horizontally disposed and each having a central portion connected to a respective one of said gap electrodes and forming an electric connection between a respective one of said gap electrodes and all capacitor electrodes of one polarity, at least the lower one of said collector electrodes being provided with a predetermined number of openings corresponding to the number of said multiplicity of capacitors, said openings being distributed in a circular arrangement around the peripheral marginal zone of said collector electrode, said capacitors being located beneath respective openings of said lower collector electrode, the upper one of said collector electrodes having an opening in its central portion, and a conductor passing through said latter opening and forming the connection from said lower collector electrode to the corresponding gap electrode.

7. Shock-current generator, comprising a discharge gap having two gap electrodes, a multiplicity of capacitors disposed concentrically about said discharge gap, two area-type collector electrodes horizontally disposed and each having a central portion connected to a respective one of said gap electrodes and forming an electric connection between a respective one of said gap electrodes and all capacitor electrodes of one polarity, at least the lower one of said collector electrodes being provided with a predetermined number of openings corresponding to the number of said multiplicity of capacitors, said openings being distributed in a circular arrangement around the peripheral marginal zone of said collector electrode, said capacitors being located beneath respective openings of said lower collector electrode, the upper and lower of said collector electrodes each having a circular opening in their respective central portions, said latter openings being of different respective diameters, two tubular members spacedly and coaxially arranged and respectively joined to said upper and lower collector electrodes at the edges of said respective central circular openings, said tubular members forming respective terminals for said gap electrodes.

8. Shock-current generator, comprising a discharge gap having two gap electrodes, a multiplicity of capacitors disposed concentrically about said discharge gap, two area-type collector electrodes horizotnally disposed and each having a central portion connected to a respective one of said gap electrodes and forming an electric connection between a respective one of said gap electrodes and all capacitor electrodes of one polarity, at least the lower one of said collector electrodes being provided with a predetermined number of openings corresponding to the number of said multiplicity of capacitors, said openings being distributed in a circular arrangement around the peripheral marginal zone of said collector electrode, said capacitors being located beneath respective openings of said lower collector electrode, at least the upper one of said collector electrodes having a circular opening in its central portion, and the central portions of said upper and lower collector electrodes being bent into concentrically arranged funnel shapes.

9. Shock-current generator, comprising a discharge gap having two gap electrodes, a multiplicity of capacitors disposed concentrically about said discharge gap, two area-type collector electrodes horizontally disposed and each having a central portion connected to a respective one of said gap electrodes and forming an electric connection between a respective one of said gap electrodes and all capacitor electrodes of one polarity, at least the lower one of said collector electrodes being provided with a predetermined number of openings corresponding to the number of said multiplicity of capacitors, said openings being distributed in a circular arrangement around the peripheral marginal zone of said collector electrode, said capacitors being located beneath respective openings of said lower collector electrode, at least the upper one of said collector electrodes having a circular opening in its central portion, a housing enclosing said discharge gap and carrying one of said gap electrodes, tubular means joined to the peripheral edges of said central circular opening and forming flanges adapted for fastening to said housing enclosing said discharge gap.

10. Shock-current generator, comprising a discharge gap having two gap electrodes, a multiplicity of capacitors disposed concentrically about said discharge gap, and two area-type collector electrodes each having a central portion connected to a respective one of said gap electrodes and forming an electric connection between a respective one of said gap electrodes and all capacitor electrodes of one polarity, said collector electrodes being formed as circular metal discs, each of said collector electrodes having a circular opening in its respective central portion, said latter openings being of different respective diameters, two tubular members spacedly and coaxially arranged and respectively joined to said collector electrodes at the edges of said respective central circular openings, and a dielectric body embedded between said collector electrodes and having a portion extending into said tubular members.

11. Shock-current generator, comprising a discharge gap having two gap electrodes, a multiplicity of capacitors disposed concentrically about said discharge gap, two area-type collector electrodes horizontally disposed and each having a central portion connected to a respective one of said gap electrodes and forming an electric connection between a respective one of said gap electrodes and all capacitor electrodes of one polarity, at least the lower one of said collector electrodes being provided with a predetermined number of openings corresponding to the number of said multiplicity of capacitors, said openings being distributed in a circular arrangement around the peripheral marginal zone of said collector electrode, said capacitors being located beneath respective ones of said lower collector electrode, a housing surrounding said capacitors and connected to a capacitor electrode of one polarity, and means forming a ground connection from the lower of said collector electrodes and from said housing surrounding said capacitors.

References Cited in the file of this patent
UNITED STATES PATENTS

| | | |
|---|---|---|
| 2,844,740 | Schofield | July 22, 1958 |
| 2,878,401 | Schwenmin | Mar. 17, 1959 |
| 2,895,060 | Dorn | July 14, 1959 |